United States Patent
Jung et al.

(10) Patent No.: US 12,046,738 B2
(45) Date of Patent: Jul. 23, 2024

(54) APPARATUS FOR AUTOMATICALLY SUPPLYING ELECTRODE PLATE

(71) Applicant: SK Innovation Co., Ltd., Seoul (KR)

(72) Inventors: Jae Young Jung, Daejeon (KR); Ji Won Yang, Daejeon (KR); Young Rae Oh, Daejeon (KR)

(73) Assignee: SK ON CO., LTD., Seoul (KR)

( * ) Notice: Subject to any disclaimer, the term of this patent is extended or adjusted under 35 U.S.C. 154(b) by 247 days.

(21) Appl. No.: 17/475,614

(22) Filed: Sep. 15, 2021

(65) Prior Publication Data
US 2022/0140301 A1    May 5, 2022

(30) Foreign Application Priority Data
Oct. 29, 2020   (KR) .................. 10-2020-0142303

(51) Int. Cl.
*H01M 4/04* (2006.01)
*H01M 4/70* (2006.01)

(52) U.S. Cl.
CPC ............... *H01M 4/04* (2013.01); *H01M 4/70* (2013.01)

(58) Field of Classification Search
CPC ......... H01M 4/04; H01M 4/70; H01M 4/0404
See application file for complete search history.

(56) References Cited

FOREIGN PATENT DOCUMENTS

| CN | 104583783 A | * | 4/2015 | ............ B23K 20/10 |
|---|---|---|---|---|
| CN | 104492904 B | * | 1/2017 | |
| CN | 106586180 A | | 4/2017 | |
| CN | 206122928 U | | 4/2017 | |
| JP | 2001-313065 A | | 11/2001 | |
| JP | 2017-152075 A | | 8/2017 | |
| KR | 101806236 B1 | | 12/2017 | |
| KR | 101857396 B1 | | 5/2018 | |
| WO | 101329073 B1 | * | 11/2013 | ........ H01M 10/0404 |
| WO | 2014/014196 A1 | | 1/2014 | |
| WO | WO-2016002798 A1 | * | 1/2016 | ............... B65H 3/48 |

OTHER PUBLICATIONS

Machine translation of WO 2016002798 A1 (Year: 2016).*
Machine translation of CN 104583783 A (Year: 2015).*
Machine translation of CN 104492904 B (Year: 2017).*
Machine translation of KR 101329073 B1 (Year: 2013).*
Extended European Search Report issued by the European Patent Office on Feb. 25, 2022.
Office Action for the Chinese Patent Application No. 202111129631.X issued by the Chinese Patent Office on Apr. 24, 2023.

* cited by examiner

*Primary Examiner* — Matthew T Martin
*Assistant Examiner* — Unique Jenevieve Luna
(74) *Attorney, Agent, or Firm* — IP & T GROUP LLP (57) ABSTRACT

An apparatus for automatically supplying an electrode plate, may include: a magazine provided by stacking a plurality of electrode plates; a lifting unit provided on the magazine, and on which the electrode plate is seated; and a sensing member provided in the lifting unit, and configured to sense an electrode plate disposed in a lowermost position of the electrode plates.

9 Claims, 6 Drawing Sheets

APPARATUS FOR AUTOMATICALLY SUPPLYING ELECTRODE PLATE

CROSS-REFERENCE TO RELATED APPLICATION(S)

This application claims the benefit under 35 USC 119(a) of Korean Patent Application No. 10-2020-0142303 filed on Oct. 29, 2020 in the Korean Intellectual Property Office, the entire disclosure of which is incorporated herein by reference in its entirety.

BACKGROUND

1. Field

The present disclosure relates to an apparatus for automatically supplying an electrode plate.

2. Description of Related Art

As technological development and demand for mobile devices and electric vehicles are increasing, demand for secondary battery cells as an energy source is also rapidly increasing. A secondary battery cell allows repeated charging and discharging because conversion between chemical energy and electrical energy is reversible.

A secondary battery cell includes an electrode assembly such as a positive electrode, a negative electrode, a separator, an electrolyte, and the like, which are main components of a secondary battery, and a cell body member of a laminated film case protecting the same.

Typically, electrode plates such as positive electrodes, negative electrodes, and the like, are supplied to manufacture the secondary battery cell, and these electrode plates are supplied one by one in a state in which a plurality thereof are stacked by an apparatus for automatically supplying an electrode plate.

However, when all such electrode plates are exhausted in the apparatus for automatically supplying an electrode plate, manufacturing of secondary battery cells is stopped, and thus, a plurality of electrode plates must be stacked again and provided in the apparatus for automatically supplying an electrode plate.

To this end, the apparatus for automatically supplying an electrode plate may be provided with a sensing member for sensing the electrode plate. However, in order that such a sensing member may be provided in an upper portion of the apparatus for automatically supplying an electrode plate to sense exhaustion of the electrode plate, it moves to an upper surface of the electrode plate disposed at an uppermost portion of the electrode plate to sense presence or absence of the electrode plate.

In the case of this configuration, when an electrode plate disposed in the uppermost position is supplied for manufacturing the secondary battery cell, the sensing member must be displaced from the electrode plate, and when the presence or absence of the electrode plate is sensed, the sensing member should be disposed on the electrode plate, such that the sensing member must be configured to move in a swing motion.

However, when configured as described above, there is a problem in that disconnection of wires, or the like, connected to the sensing member easily occurs.

In addition, in the prior art, a color sensor is used as the sensing member for sensing a color difference between a color of the electrode plate and a color of a magazine provided with the electrode plate. In this case, there is a problem in that missensing may be caused because of light reflection on the electrode plate.

Therefore, there exists a need to develop an improved apparatus for automatically supplying an electrode plate that improves and mitigates the above-mentioned limitations of existing apparatuses.

SUMMARY

An aspect of the present invention is to provide an improved apparatus for automatically supplying an electrode plate from a stack of electrode plates loaded on the apparatus for the manufacture of secondary batteries.

An advantage of the present invention apparatus is that it mitigates and overcomes a problem of disconnection of wires to a sensing member of the apparatus which may occur with existing apparatuses.

Another advantage of the present invention is that it mitigates and overcomes another problem of existing apparatuses in which a sensing member may missense an electrode plate.

According to an embodiment of the present disclosure, an apparatus for automatically supplying an electrode plate, includes: a magazine provided by stacking a plurality of electrode plates; a lifting unit provided on the magazine and on which the electrode plate is seated; and a sensing member provided in the lifting unit, and configured to sense an electrode plate disposed in a lowermost position of the electrode plates.

Specifically, according to an aspect of the present disclosure, the lifting unit of the apparatus for automatically supplying an electrode plate may include: a support to which the sensing member is coupled, being moved vertically in the magazine, and on which the electrode plate is seated; and a driving member coupled to the support, and configured to move the support vertically.

Here, according to an aspect of the present disclosure, in the support of the apparatus for automatically supplying an electrode plate, a sensing hole may be formed in a vertical direction, and the sensing member may be coupled to penetrate through the sensing hole to sense a lower surface of the electrode plate.

In addition, according to an aspect of the present disclosure, in the support of the apparatus for automatically supplying an electrode plate, a rounded chamfer portion may be formed at an upper end portion of the sensing hole, adjacent to the upper surface on which the electrode plate is seated.

According to an aspect of the present disclosure, the support of the apparatus for automatically supplying an electrode plate may be formed such that a width of the sensing hole is smaller than at least 15 mm, a radius of curvature of the chamfer portion is greater than at least 0.5 mm.

In addition, according to an aspect of the present disclosure, in the support of the apparatus for automatically supplying an electrode plate, the upper surface on which the electrode plate is seated may be formed to be rounded.

According to an aspect of the present disclosure, in the support of the apparatus for automatically supplying an electrode plate, an anchor frame to which the sensing member is coupled may be provided on a lower surface.

Here, the anchor frame of the apparatus for automatically supplying an electrode plate according to an embodiment of the present disclosure may be provided inside a peripheral region of the lower surface of the support.

In addition, the sensing member of the apparatus for automatically supplying an electrode plate according to an embodiment of the present disclosure may be a direct reflection-type photosensor.

The magazine of the apparatus for automatically supplying an electrode plate according to an embodiment of the present disclosure may include a bottom plate portion having a through-hole formed therein so that the lifting unit may move vertically, and a sidewall portion coupled to the bottom plate portion, and disposed to surround at least a portion of edges of the electrode plate.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depiction of elements in the drawings may be exaggerated for clarity, illustration, and convenience.

Hereinafter, embodiments of the present disclosure will be described with reference to various embodiments. However, embodiments of the present disclosure may be modified to have various other forms, and the scope of the present disclosure is not limited to the embodiments described below.

The present disclosure relates to an apparatus for automatically supplying an electrode plate for the manufacture of a secondary battery, and the apparatus for automatically supplying an electrode plate may include a sensing member 30 for sensing a lower surface of an electrode plate E disposed in a lowermost position of a stack of a plurality of electrode plates E provided in a magazine 10, such that it is possible to mitigate and resolve a problem of disconnection of wires, or the like connected to the sensing member 30.

In another aspect, the apparatus for automatically supplying an electrode plate of the present disclosure can mitigate and resolve a problem in that the electrode plate E is missensed by providing the sensing member 30 as a direct reflection-type photosensor.

That is, the apparatus for automatically supplying an electrode plate of the present disclosure may supply an electrode plate E for manufacturing a secondary battery cell. In this case, the sensing member 30 for sensing exhaustion of the electrode plate E may be provided in a lifting unit 20 to sense a lower surface of the electrode plate E disposed in a lowermost position of a stack of the plurality of electrode plates, such that it is possible to solve the above-described problem.

Here, the secondary battery cell may include an electrode assembly including an electrode plate E of a positive electrode and a negative electrode, and a cell body member surrounding the electrode assembly. The cell body member may include an accommodating portion in which the electrode assembly is accommodated and a sealing portion sealing a periphery of the accommodating portion.

The electrode assembly is used to be accommodated in the cell body member together with an electrolyte. The electrolyte may include lithium salts such as $LiPF_6$, $LiBF_4$, and the like in an organic solvent such as EC (ethylene carbonate), PC (propylene carbonate), DEC (diethyl carbonate), EMC (ethyl methyl carbonate), DMC (dimethyl carbonate), or the like. Furthermore, the electrolyte may be in a liquid, solid or gel state.

The cell body member protects the electrode assembly, and is configured to accommodate the electrolyte. For example, the cell body member may be provided as a pouch-type member or a can-type member. The pouch-type member has a form sealing and accommodating the electrode assembly on three or four surfaces, and is a member configured to seal by overlapping and bonding three surfaces of an upper surface portion and both side surface portions, except for one surface portion, which is mainly a lower portion, in a state in which the electrode assembly is accommodated therein. In addition, the can-type member is a type of member accommodating the electrode assembly by sealing it on one surface, and it is a member which is configured to seal by overlapping one surface of an upper surface portion except for three surfaces, which are mainly a lower portion and both side surface portions, in a state in which the electrode assembly is accommodated therein.

However, the pouch-type secondary battery cell, and the can-type secondary battery cell are merely examples, and the secondary battery cells manufactured by supplying the electrode plate E by the apparatus for automatically supplying an electrode plate of the present disclosure are not limited thereto.

Figure 1:
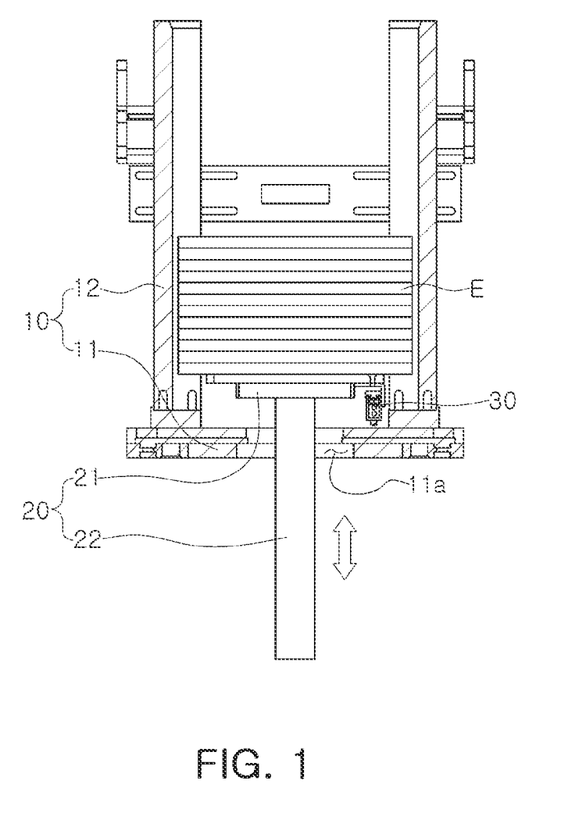
FIG. 1 is a front view illustrating an apparatus for automatically supplying an electrode plate of the present disclosure.

Specifically, referring to the drawings, FIG. 1 is a front view illustrating an apparatus for automatically supplying an electrode plate. Referring to FIG. 1, the apparatus for automatically supplying an electrode plate may include a magazine 10, a lifting unit 20, and a sensing member 30.

The magazine 10 may be configured to accommodate a plurality of electrode plates E. For example, the plurality of electrode plates E are stacked in a space defined by the magazine 10. The lifting unit 20 may be provided in the magazine 10. The electrode plate E may be seated on the magazine 10. The sensing member 30 may be coupled to the lifting unit 20, and may sense an electrode plate disposed in the lowermost position of the plurality of electrode plates E.

As described above, the magazine 10 serves as a housing in which the plurality of electrode plates E are stacked. An electrode plate disposed in an uppermost position of the plurality of electrode plates E lifted by the lifting unit 20 may be discharged through an upper end portion of the magazine 10 for manufacturing secondary battery cells. The lifting unit 20 may support the plurality of electrode plates E.

The magazine 10 may include a bottom plate portion 11 and a sidewall portion 12. That is, the magazine 10 of the apparatus for automatically supplying an electrode plate of the present disclosure may include a bottom plate portion 11 having a through-hole 11a formed therein so that the lifting unit 20 may pass through the through-hole 11a, and a sidewall portion 12 coupled to the bottom plate portion 11. The sidewall portion 12 may be disposed to surround at least a portion of the side edges of the plurality of the electrode plates E.

As described above, the bottom plate portion 11 may have a through-hole 11a formed therein in order for the lifting unit 20 to pass therethrough. The through-hole 11a may also be formed in a size through which the support 21 of the lifting unit 20 can pass, or may also be formed in a size through which only the driving member 22 can pass. When the through-hole 11a is formed to have a size through which only the driving member 22 can pass, the support 21 may be provided in the magazine 10 by being coupled to the driving member 22 in a state of being disposed upwardly of the bottom plate portion 11.

The sidewall portion 12 may be coupled to the edge portion of the bottom plate portion 11 to prevent the stacked plurality of electrode plates E from being separated from each other.

The sidewall portion 12 may be coupled to the bottom plate portion 11 and be configured to guide the movement of the stack of electrode plates in an upward direction while preventing any of the electrode plates E from being separated.

The sidewall portion 12 may be coupled to the bottom plate portion 11 and be configured to guide the movement in an upward direction of the stack of electrode plates while preventing any of the electrode plates E from moving sideway.

To this end, the side wall portion 12 may be provided to surround at least a portion of the edge portions of the electrode plates E. For example, the sidewall portion 12 may be provided in an angled cross-sectional shape (when viewed from the top) surrounding a vertex portion of each of the electrode plates E of the stack of electrode plates that are disposed within the magazine 10. For example, the sidewall portion 12 may be provided in an orthogonal angled cross-sectional shape as shown in the embodiment of FIG. 1 surrounding a vertex portion of each of the electrode plates E of the stack of electrode plates that are disposed within the magazine 10. The sidewall portion 12 may in another embodiment (not shown) be provided in a form of a straight cross-sectional shape surrounding at least a portion of each of the four sides of each of the electrode plates E. The electrode plates E may have a generally rectangular planar shape.

The lowermost electrode plate E is seated on the lifting unit 20 with the remaining of the plurality of the electrode plates E of the electrode stack stacked on top of each other over the lowermost electrode plate E. That is, the lifting unit 20 serves to support the plurality of electrode plates E in a fixed state. In addition, the lifting unit 20 may also serve to lift the electrode plates E to an upper portion of the magazine 10. That is, the lifting unit 20 may serve to lift the stack of the electrode plates E so that the electrode plate disposed in an uppermost position of the plurality of electrode plates E is lifted to an upper end portion of the magazine 10 for manufacturing secondary battery cells.

To this end, the lifting unit 20 may include a support 21 and a driving member 22, a detailed description thereof will be described later with reference to FIGS. 2 to 5.

The sensing member 30 may be configured to sense whether the stack of the electrode plates E provided inside the magazine 10 is exhausted. That is, the sensing member 30 senses whether all of the stacked electrode plates E are exhausted as they are supplied for manufacturing secondary battery cells.

To this end, the sensing member 30 may be disposed in the lifting unit 20. Accordingly, the sensing member 30 senses the electrode plate E disposed in a lowermost position of the electrode plates E. For example, the sensing member 30 senses a lower surface of the electrode plate E disposed in a lowermost position of the electrode plates E.

In addition, since the sensing member 30 is disposed in the lifting unit 20, the sensing member 30 only moves vertically together with the lifting unit 20, and since there is no need to move left and right by a swing operation, it is possible to mitigate and resolve a problem of disconnection of the wires, or the like, connected to the sensing member 30.

In addition, the sensing member 30 of the apparatus for automatically supplying an electrode plate according to an embodiment of the disclosure may be a direct reflection-type photosensor. That is, without using a color sensor sensing a color difference between a color of the electrode plate E and a color of the magazine 10 on which the electrode plate E is provided, only a direct reflection-type photosensor in which only the presence or absence of members such as the electrode plate E is sensed may be used, such that it is possible to mitigate and resolve a problem of missensing due to light interference in a surrounding environment. In addition, the sensing member 30 may be a direct reflection-type photosensor. The direct reflection-type photosensor detects only the presence or absence of a target member (i.e., an electrode plate E for this embodiment). The direct reflection-type photosensor may reduce missensing errors that may result from using a color sensor which detects a color difference between the color of the electrode plate E and the color of the magazine 10.

Here, the direct reflection-type photosensor is a photosensor in which a light transmitting unit and a light receiving unit are integrated, and when light emitted from the light transmitting unit is reflected by a sensed object and is incident on the light receiving unit, an amount of light may be determined and output.

Conventionally, since it senses an upper surface of the uppermost electrode plate E when viewed in a vertical direction, when a direct reflection-type photosensor is used, the bottom plate portion 11 and the electrode plate E of the magazine 10 cannot be distinguished, and the absence thereof is always sensed. Therefore, according to the conventional structure, the direct reflection-type photosensor cannot be used and a color sensor has to be used. However, in the present disclosure, a lower surface of the lowermost electrode plate E is sensed in a vertical direction, the magazine 10 with an open upper end has no room to be sensed, and only the electrode plate E is sensed. Therefore, since it is only necessary to sense the presence or absence of a member without distinguishing the color difference between the magazine 10 and the electrode plate E, a direct reflection-type photosensor can be used. Conventional apparatuses for automatically supplying an electrode plate include a sensing member sensing an upper surface of the upper most electrode plate among the stack of electrode plates. The conventional apparatuses cannot use a direct reflection-type photosensor because the sensing member cannot differentiate the bottom plate portion of the magazine 10 and the electrode plate inside the magazine 10. Therefore, the conventional apparatuses should use a color sensor. An embodiment of the present disclosure, however, uses the sensing member 30 that detects the absence or presence of the electrode plate E by sensing the electrode plate E positioned in the lowermost portion of the plurality of electrode plates E. The sensing member 30 may not sense any member other than the electrode plate E because the magazine 10 has an open upper end. Therefore, the embodiment of the present disclosure may use the direct reflection-type photosensor.

Figure 2:
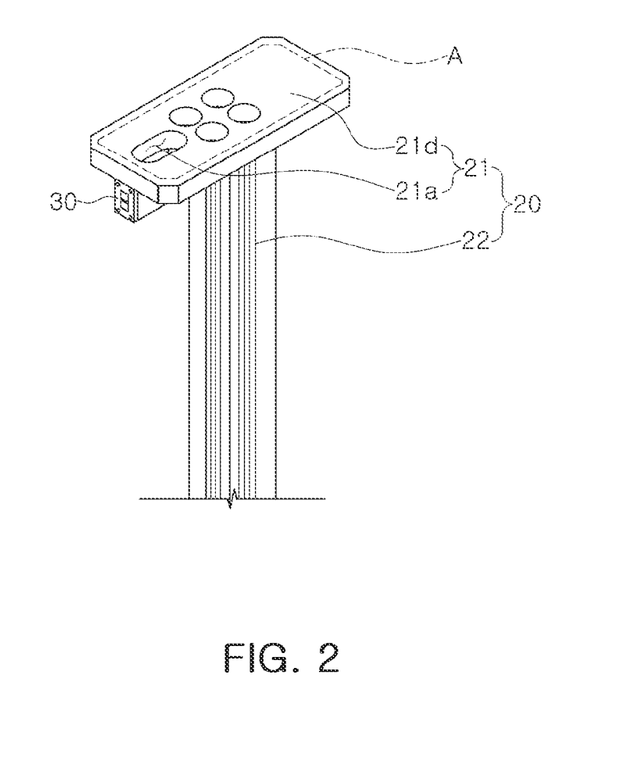
FIG. 2 is a perspective view illustrating a lifting unit in the apparatus for automatically supplying an electrode plate of the present disclosure.
Figure 3A:
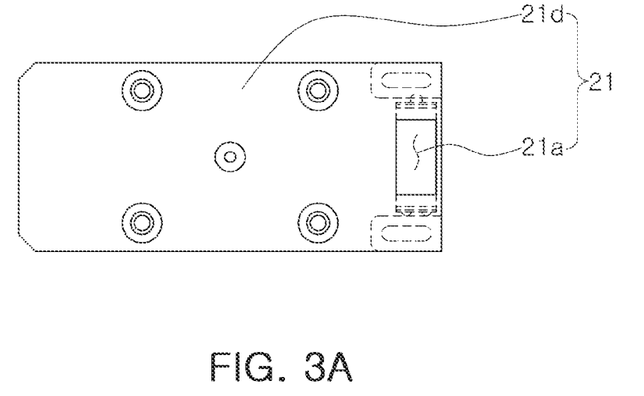
FIG. 3A is a plan view illustrating a lifting unit in the apparatus for automatically supplying an electrode plate of the present disclosure.
Figure 3B:
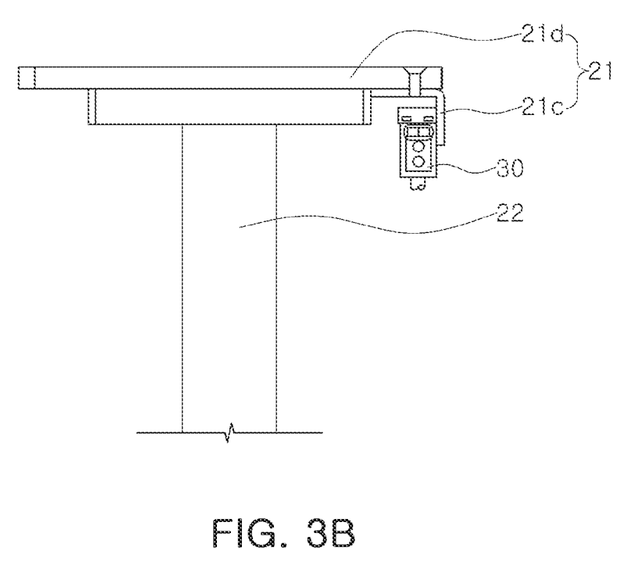
FIG. 3B is a front view illustrating a lifting unit in the apparatus for automatically supplying an electrode plate of the present disclosure.

FIG. 2 is a perspective view illustrating a lifting unit 20 in an apparatus for automatically supplying an electrode plate of the present disclosure. FIGS. 3A and 3B are a plan view and a front view, respectively, illustrating the lifting unit 20 in an apparatus for automatically supplying an electrode plate of the present disclosure. That is, an embodiment in which a sensing member 30 can be provided inside a peripheral region (A) of a support plate 21d of the support 21 is illustrated.

Figure 4:
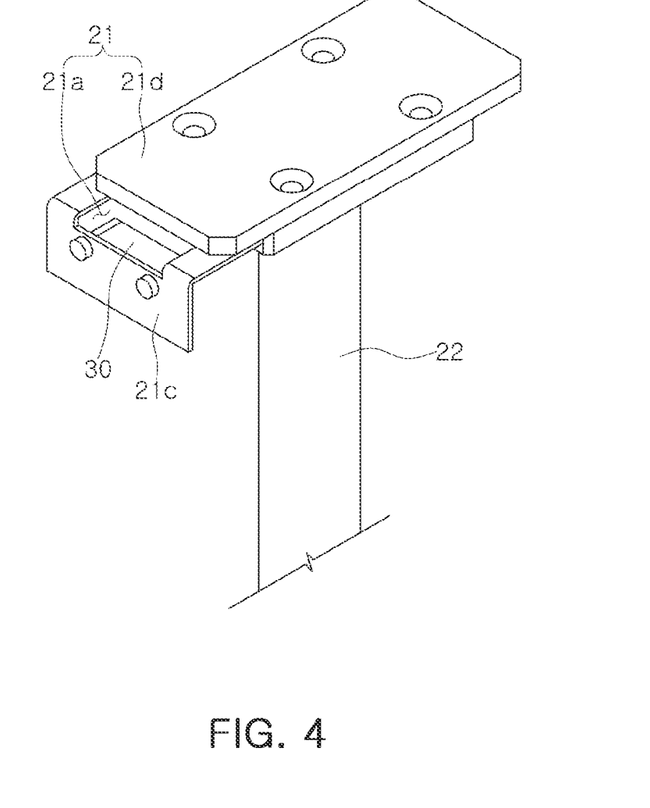
FIG. 4 is a perspective view illustrating another embodiment of the lifting unit in the apparatus for automatically supplying an electrode plate of the present disclosure.
Figure 5A:
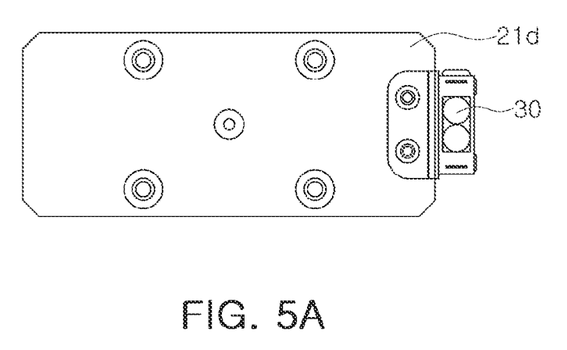
FIG. 5A is a plan view illustrating another embodiment of the lifting unit in the apparatus for automatically supplying an electrode plate of the present disclosure.
Figure 5B:
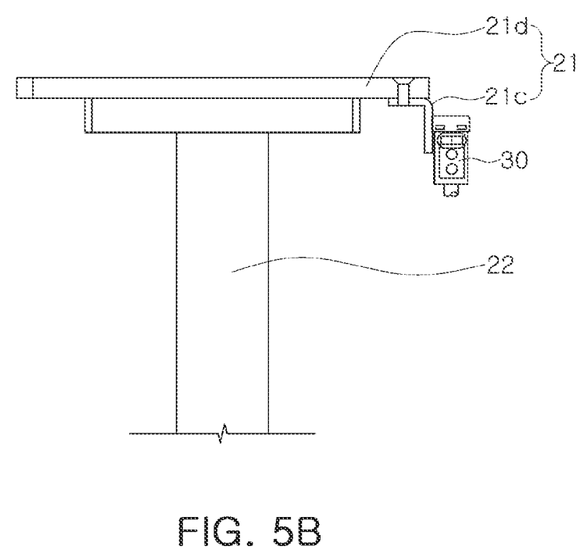
FIG. 5B is a front view illustrating another embodiment of the lifting unit in the apparatus for automatically supplying an electrode plate of the present disclosure.

FIG. 4 is a perspective view illustrating another embodiment of the lifting unit 20 in the apparatus for automatically supplying an electrode plate of the present disclosure, and FIGS. 5A and 5B are a plan view and a front view, respectively, illustrating another embodiment of the lifting unit 20 in the apparatus for automatically supplying an electrode plate of the present disclosure. That is, it shows an embodiment in which a sensing member 30 can be provided outside of a peripheral region (A) of a support plate 21d of a support 21.

Referring to these drawings, the lifting unit 20 of the apparatus for automatically supplying an electrode plate of the present disclosure may include a support 21 to which the sensing member 30 is coupled. The support 21 may move vertically through a bottom plate portion 11 of the magazine 10. The lowermost electrode plate E may sit on the magazine 10. The lifting unit 20 may further include a driving member 22 coupled to the support 21. The driving member 22 may move the support 21 vertically.

That is, in order to move the electrode plate E to an upper portion of the magazine 10, the electrode plate E may be seated and supported on the support 21, and the driving member 22 may be configured to move the support 21 vertically.

Here, the support 21 may be provided in a form of a plate, and may provide a seating plane for seating the electrode plate E. In the support 21, a bolt may be provided to pass through so as to be coupled to the driving member 22. In other words, a bolt may pass through the support 21 and the driving member 22 to couple each other together.

A sensing hole 21*a* may be formed so that the sensing member 30 may sense a lower surface of the electrode plate E. That is, in the support 21 of the apparatus for automatically supplying an electrode plate according to an embodiment of the present disclosure, a sensing hole 21*a* may be formed in a vertical direction, and the sensing member 30 may be coupled thereto so that the sensing member 30 may sense the light that passes through the sensing hole 21*a* and sense the lower surface of the electrode plate E.

Here, the sensing hole 21*a* may be formed directly above the support 21 provided with the sensing member 30.

As described above, the sensing member 30 may be configured to sense the electrode plate E vertically, so that the sensing member 30 can be coupled to the support 21. As a result, the sensing member 30 does not have to move left and right due to a swing operation, so that problems such as disconnection of wires, or the like, can be mitigated and resolved.

The support 21 may include an anchor frame 21*c* to which the sensing member 30 is coupled. That is, the support 21 of the apparatus for automatically supplying an electrode plate according to an embodiment of the present disclosure may be provided on a lower surface (also referred to as a bottom surface) thereof with an the anchor frame 21*c* to which the sensing member 30 is coupled. The anchor frame 21*c* may be disposed on the bottom surface of the support 21 and the sensing member 30 may be coupled to the anchor frame 21*c*.

Such an anchor frame 21*c* may couple the sensing member 30 to the lower surface of the support 21. In a first embodiment shown in FIGS. 2 and 3, the anchor frame 21*c* is provided inside a peripheral region (A) of a support plate 21*d* of the support 21. That is, the anchor frame 21*c* of the apparatus for automatically supplying an electrode plate according to an embodiment of the present disclosure may be provided inside the peripheral region A of the lower surface of the support 21. In this case, a size of the through hole formed in the bottom plate portion 11 of the magazine 10 through which the support 21 passes may be formed to be relatively small.

In a second embodiment shown in FIGS. 4 and 5, the anchor frame 21*c* is provided outside of a peripheral region (A) of a support plate 21*d* of a support 21. In this case, a sensing hole 21*a* is not formed in a support plate 21*d* of the support 21. The sensing hole 21*a* may be formed by adjusting a distance between the support plate 21*d* and the anchor frame 21*c*.

Figure 6:
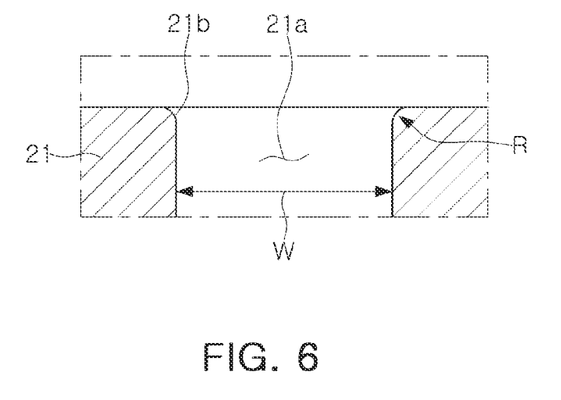
FIG. 6 is a cross-sectional view illustrating a sensing hole portion of the lifting unit in the apparatus for automatically supplying an electrode plate of the present disclosure.

Referring to FIG. 6, a rounded chamfer portion 21*b* may be formed around an upper end portion of the sensing hole 21*a* so that a mark by the sensing hole 21*a* is not formed on the electrode plate E seated on the support 21. In addition, a radius of curvature R of the chamfer portion 21*b* and a width W of the sensing hole 21*a* may be limited. A detailed description thereof will be described later with reference to FIG. 6.

The driving member 22 serves to move the support 21 vertically in the magazine 10. To this end, the driving member 22 may be coupled to the support 21 with a bolt, or the like. The driving member 22 may be comprised of a hydraulic cylinder, a motor, or the like to provide driving force for moving the support 21 vertically.

FIG. 6 is a cross-sectional view illustrating a portion of a sensing hole 21*a* of a lifting unit 20 in an apparatus for automatically supplying an electrode plate. Referring to FIG. 6, the support 21 of the apparatus for automatically supplying an electrode plate according to the present disclosure may have a rounded chamfer portion 21*b* formed therein at an upper end portion of the sensing hole 21*a*, adjacent to an upper surface of the support 21 on which the electrode plate E is seated.

That is, the rounded chamfer portion 21*b* may be formed around the upper end of the sensing hole 21*a* so that a mark by the sensing hole 21*a* is not formed on the electrode plate E seated on the support 21.

In other words, when the plurality of electrode plates E are stacked and provided on the support 21, a self-weight may be great enough to form a mark on the electrode plate E disposed in a lowermost portion thereof. Therefore, in order to prevent a mark caused by the sensing hole 21*a* on the electrode plate E in the lowermost portion thereof in contact with the support 21, a chamfer portion 21*b* may be formed at an upper end portion of the sensing hole 21*a*.

In addition, a radius of curvature R of the chamfer portion 21*b* and a width W of the sensing hole 21*a* may be limited. That is, in the support 21 of the apparatus for automatically supplying an electrode plate may be formed such that the width (W) of the sensing hole 21*a* is at least less than 15 mm, and the radius of curvature (R) of the chamfer portion 21*b* (R) is at least greater than 0.5 mm.

Such numerical limitation is a numerical range in which no marks are formed on the lowermost electrode plate E, and when it is out of this numerical range, the probability of generating marks to an extent of reducing the performance of the electrode plate E is relatively increased.

Figure 7:
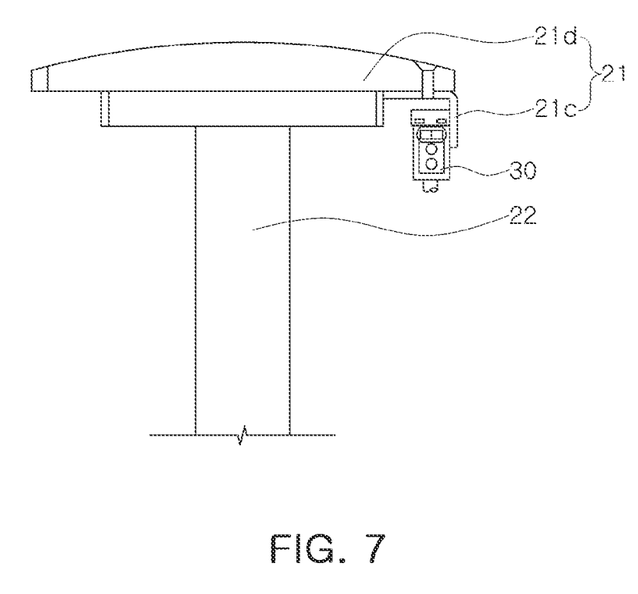
FIG. 7 is a front view illustrating an embodiment in which an upper surface of a support of the lifting unit is rounded in the apparatus for automatically supplying an electrode plate of the present disclosure.

FIG. 7 is a front view illustrating an embodiment in which an upper surface of a support 21 of a lifting unit 20 is rounded in an apparatus for automatically supplying an electrode plate of the present disclosure. Referring to FIG. 7, according to an embodiment of the present disclosure, the support 21 of the apparatus for automatically supplying an electrode plate may have an upper surface formed therein on which the electrode plate E is seated.

That is, the support 21 has a rounded upper surface on which the electrode plate E is seated, and is disposed such that the plurality of stacked electrode plates E are bent to correspond to the rounded shape of the upper surface of the support 21 by self-weight. Accordingly, it is possible to resolve a problem in which the electrode plate E is indented into the sensing hole 21*a* and a mark is generated.

Here, a rounded radius of curvature of the support 21 may be limited to a radius of curvature at which the electrode plate E is bent within an elastic limit when it is bent by its own weight.

As set forth above, according to an apparatus for automatically supplying an electrode plate according to an embodiment of the present disclosure, there is an advantage in that it is possible to resolve a problem of disconnection of wires, or the like, connected to a sensing member.

In another aspect, the apparatus for automatically supplying an electrode plate of the present disclosure has an advantage for improving a problem in that a sensing member missenses an electrode plate.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for automatically supplying an electrode plate, comprising:
a magazine in which a plurality of electrode plates are placed on top of each other forming a stack;
a lifting unit operatively coupled with the magazine for supporting and moving the stack of the plurality of electrode plates within the magazine; and
a sensing member provided in the lifting unit, the sensing member being configured to sense a lowermost electrode plate disposed in a lowermost position of the stack of the plurality of the electrode plates,
wherein the lifting unit comprises:
a support to which the sensing member is coupled, the support being movable vertically in the magazine by a driving member; and
the driving member coupled to the support, and configured to move the support vertically within the magazine,
wherein the lowermost electrode of the stack of the plurality of the electrode plates is seated on the support, wherein the support comprises:
a support plate disposed inside the magazine for positioning and supporting the stack of the plurality of electrode plates;
an anchor frame provided outside a circumferential region of the support plate and coupled to the sensing member; and
a sensing hole formed between the support plate and the anchor frame, and
wherein the sensing member is configured to sense a bottom surface of the lowermost electrode plate through the sensing hole.

2. The apparatus of claim 1, wherein the support is formed such that a width of the sensing hole is less than 15 mm.

3. The apparatus of claim 1, wherein an upper surface of the support on which the lowermost electrode plate is seated is formed to be rounded.

4. The apparatus of claim 1, wherein the sensing member is a direct reflection-type photosensor.

5. The apparatus of claim 1, wherein the magazine comprises:
a bottom plate portion having a through-hole formed therein so that the lifting unit can move through the bottom plate portion; and
a sidewall portion coupled to the bottom plate portion, and disposed to surround at least a portion of edges of each of the plurality of the electrode plates.

6. An apparatus for supplying an electrode plate for manufacturing a secondary battery, the apparatus comprising:
a magazine including a bottom plate portion and a sidewall portion coupled to each other to form a receptacle for receiving a stack of a plurality of electrode plates;
a lifting unit including a support and a driving member coupled to the support, the support including a support plate disposed inside the magazine for positioning and supporting the stack of the plurality of electrode plates, wherein the driving member is movable through the opening of the bottom plate portion of the magazine for driving the stack of the electrode plates up and down within the magazine; and
a sensing member coupled to the lifting unit, the sensing member being configured to detect the presence of a lowermost electrode plate of the stack of the plurality of the electrode plates,
wherein the support comprises:
an anchor frame provided outside a circumferential region of a lower surface of the support plate and coupled to the sensing member; and
a sensing hole formed between the support plate and the anchor frame, and vertically aligned with the sensing member to allow the sensing member to sense a bottom surface of the lowermost electrode plate through the sensing hole.

7. The apparatus of claim 6, wherein the support plate is formed such that a width of the sensing hole is less than 15 mm.

8. The apparatus of claim 7, wherein in the support plate, the upper surface on which the electrode plate is seated is formed to be rounded.

9. The apparatus of claim 6, wherein the sensing member is a direct reflection-type photosensor.

* * * * *